United States Patent [19]

Ito et al.

[11] 4,421,192
[45] Dec. 20, 1983

[54] APPARATUS FOR RUNNING A VEHICLE AT A CONSTANT SPEED

[75] Inventors: Keiichi Ito, Nagoya; Nobuyuki Yamaguchi; Kazuhiko Hayashi, both of Toyota; Ken Asami, Nagoya; Kazuo Sato; Takeshi Ochiai, both of Toyota, all of Japan

[73] Assignee: Toyota Jidosha Kogyo Kabushiki Kaisha, Toyota, Japan

[21] Appl. No.: 337,713

[22] Filed: Jan. 7, 1982

[30] Foreign Application Priority Data

Jan. 20, 1981 [JP] Japan .................................. 56-7628

[51] Int. Cl.³ ............................................. B60K 31/00
[52] U.S. Cl. ....................................... 180/179; 74/866
[58] Field of Search ............ 361/236, 242; 74/336 R, 74/866, 860; 180/178, 179; 123/352, 353, 354

[56] References Cited

U.S. PATENT DOCUMENTS

| | | | |
|---|---|---|---|
| 3,732,755 | 5/1973 | Beig et al. | 74/336 X |
| 4,117,903 | 10/1978 | Fleischer et al. | 180/179 |
| 4,133,406 | 1/1979 | Allerdist | 180/179 |
| 4,198,882 | 4/1980 | Kiencke et al. | 74/866 |

Primary Examiner—Joseph F. Peters, Jr.
Assistant Examiner—Michael Mar
Attorney, Agent, or Firm—Cushman, Darby & Cushman

[57] ABSTRACT

When a load to an engine of a vehicle running at a constant speed increases and a vehicle speed slows down below a preset vehicle speed for a constant speed running condition, a gear of an automatic transmission is shifted down. A shift-down signal for causing the gear to shift down is held for a predetermined time to prevent the shift-up of the gear in case when the vehicle speed momentarily recovers the preset vehicle speed.

10 Claims, 4 Drawing Figures

APPARATUS FOR RUNNING A VEHICLE AT A CONSTANT SPEED

BACKGROUND OF THE INVENTION (a) Field of the Invention

The present invention relates to an apparatus for running a vehicle having an automatic transmission at a constant speed.

(b) Description of the Prior Art

A conventional apparatus for running a vehicle having an automatic transmission at a constant speed uses a diaphragm actuator or a servo motor to open or close a throttle valve to attain the constant speed of the vehicle.

FIG. 1 shows a block diagram of such a conventional apparatus for running the vehicle at the constant speed. In FIG. 1, numeral 10 denotes a reed switch for detecting a running velocity of a car and numeral 12 denotes a permanent magnet which is rotated by a speed meter cable. As the permanent magnet 12 is rotated, the reed switch 10 is turned on and off to produce a pulse signal having a frequency proportional to the car velocity. The pulse signal is converted to a D.C. voltage having a level proportional to the car velocity of a frequency-voltage conversion circuit (F/V converter) 14. The output voltage from the F/V converter 14 is supplied to a memory circuit 18 during an on-time of an analog switch 16 and a value of the output voltage immediately before the analog switch 16 is turned off is stored in the memory circuit 18 as a setting voltage representing a velocity to be maintained. The memory circuit 18 is usually constructed by a capacitor, and the setting voltage stored in the capacitor is compared with the output voltage of the F/V converter 14, that is, a car velocity voltage representing the car velocity in a compare circuit 20. The compare result is fed to an actuator 28 as a drive signal through an AND circuit 24 and a drive circuit 26. A control value 28a of the actuator 28 is a driven by the drive signal.

The drive signal for controlling the drive to the actuator 28 is a pulse signal having a duty factor which is variable with a difference between the setting voltage and the car velocity voltage. When the car velocity voltage is higher than the setting voltage, a duty cycle for the control valve 28a is reduced, and when the former is lower than the latter, the duty cycle is increased.

The AND circuit 24 is opened only when an output of a self-hold circuit 34 is logical "1" to supply the output of the compare circuit 20 to the drive circuit 26.

A setting switch 38 for setting the car velocity produces a logical "0" signal when it is actuated by a driver and produces a logical "1" signal when it is deactuated. The output of the setting switch 38 is supplied, through an inverter 40, to the analog switch 16 and the self-hold circuit 34. Accordingly, the analog switch 16 is turned on when the setting switch 38 is actuated and turned off when it is deactuated. The self-hold circuit 34 is also set when the setting switch 38 is actuated.

The self-hold circuit 34 may be a flip-flop which self-holds the setting operation by the setting switch 38 and supplies the output to the drive circuit 36 and enables the AND circuit 24. The self-hold circuit 34 is reset when one of a stop lamp switch 44 which is turned on when a brake pedal is stepped on, a parking brake switch 46 which is turned on when a parking brake is activated, or a neutral start switch 48 which is turned on when a shift lever of an automatic transmission is shifted to a neutral position. As a result, the drive circuit 36 is deactivated and the AND circuit 24 is disabled.

The actuator 28 has the control valve 28a and a release valve 28b. The control valve 28a is controlled by the output of the AND circuit 24 through the drive circuit 26. When the self-hold circuit 34 is set and the drive circuit 26 is activated, the control valve 28a cuts off an atmospheric pressure from a port 28c and introduces a suction pipe vaccum pressure from a port 28d into a chamber 28e. On the other hand, when the drive circuit 26 is deactivated, the control valve 28a cuts off the vacuum pressure from the port 28d and introduces the atmospheric pressure from the port 28c into the chamber 28e. A ratio of introduction of the atmospheric pressure from th port 28c and the suction pipe vacuum pressure from the port 28d is controlled by a duty factor of the output pulse from the compare circuit 20. The release valve 28b is controlled by the output of the self-hold circuit 34 through the drive circuit 36. When the self-hold circuit 34 is set and the drive circuit 36 is activated, the release valve 28b cuts off an atmospheric pressure from a port 28f, and when the self-hold circuit 34 is reset and the drive circuit 36 is deactivated, the release valve 28b introduces the atmospheric pressure into the chamber 28e. In this manner, the pressure in the chamber 28e is controlled so that a diaphragm 28g is moved. As a result, a rod 28h linked to an accelerator link, not shown, is axially moved to control an aperture of the throttle valve to maintain the car velocity at a constant speed.

The car equipped with this apparatus, however, cannot maintain the preset car velocity in some cases when the car goes up a steep slope. The constant speed maintaining apparatus having the diaphragm actuator shown in FIG. 1 cannot follow the present car velocity when the car goes up the steep slope and hence it cannot maintain the constant speed run. When the diaphragm actuator is used, the steeper is the slope the more does the load to the vehicle increase, and hence the rotation speed of the engine reduces. As a result, the engine suction pressure decreases and the throttle valve cannot be fully drawn.

When a servo motor is used, the throttle valve can be fully drawn but because of a small transmission ratio of the vehicle a drive torque cannot follow the gradient of the slop and a traction force is not sufficiently large. As a result, the actual vehicle speed slows down from the preset vehicle speed.

SUMMARY OF THE INVENTION

It is an object of the present invention to provide an apparatus for running a vehicle having an automatic transmission at a constant speed even when a load to an engine of the vehicle increases.

It is another object of the present invention to provide an apparatus for running a vehicle at a constant speed which can prevent a so-called hunting of the vehicle in which gears is repeatedly and frequently shifted up and down.

DETAILED DESCRIPTION OF THE PREFERRED EMBODIMENTS

Figure 1:
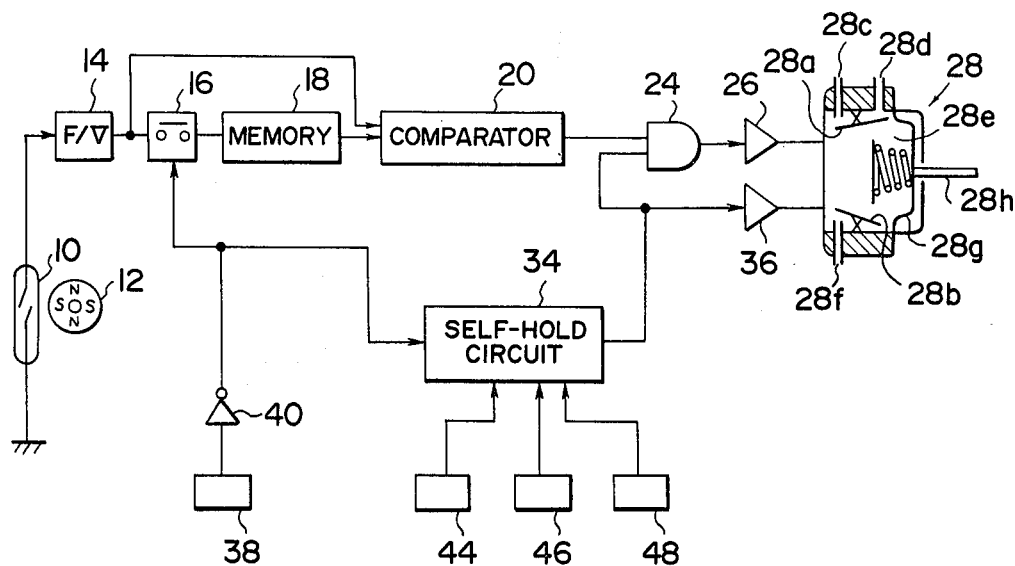
FIG. 1 shows a block diagram of a prior art apparatus for running a vehicle at a constant speed.
Figure 2:
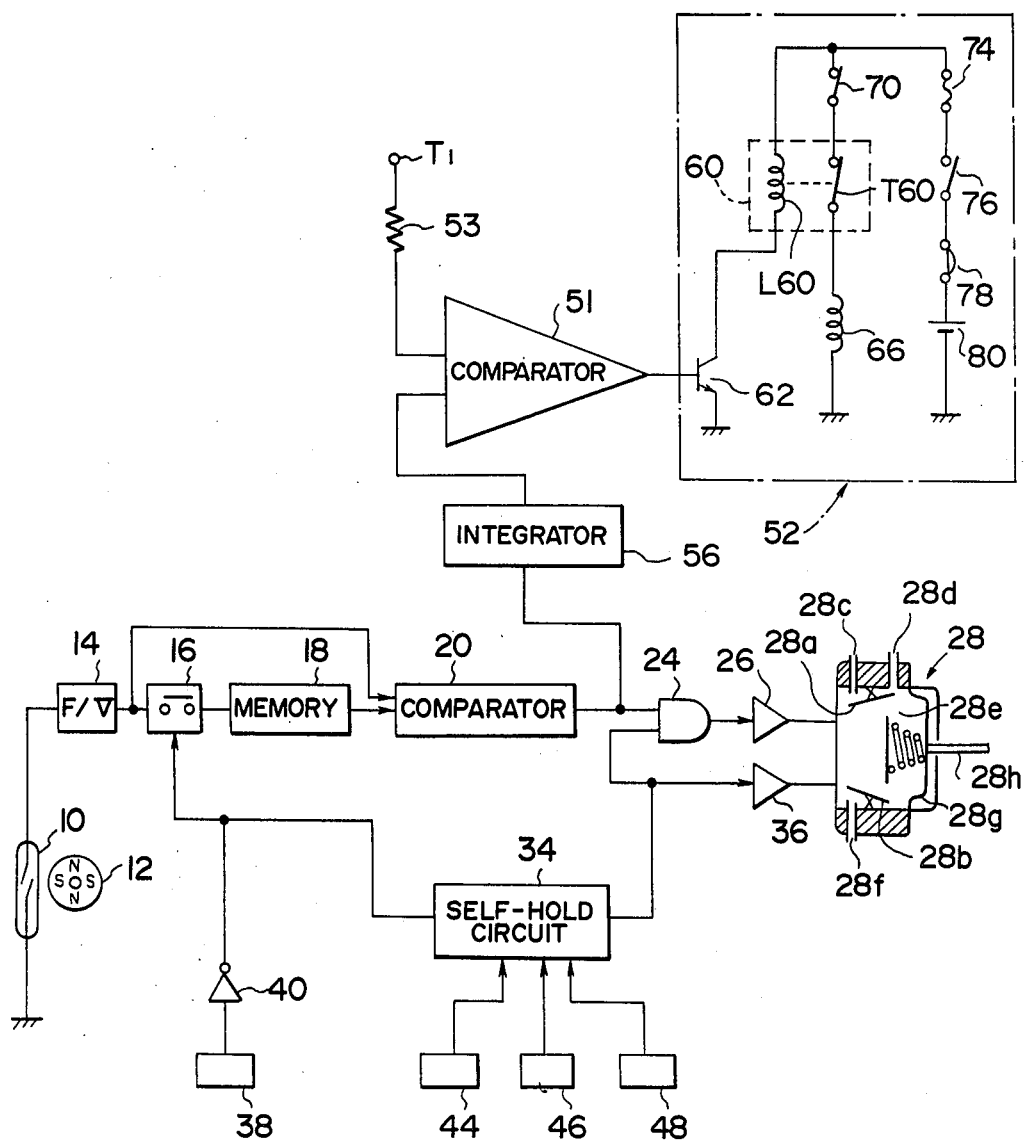
FIG. 2 shows a block diagram of one embodiment of an apparatus for running a vehicle at a constant speed in accordance with the present invention.

An apparatus for running a vehicle at a constant speed shown in FIG. 2 has a compare circuit 51 which receives an output of a compare circuit 20 through an integration circuit 20 and a shift-down circuit 52 for an automatic transmission, in addition to the elements of the prior art apparatus shown in FIG. 1. The other elements are identical to those shown in FIG. 1, and the like or corresponding elements are designated by the like numerals.

In FIG. 2, the compare circuit 51 functions as means for detecting whether the preset car speed is maintained or not. It may be a window comparator having a hysteresis characteristic. The pulse signal from the compare circuit 20 is applied to one input terminal of the compare circuit 51 through the integration circuit 56, and a reference voltage is applied to the other input terminal from a terminal T1 connected to a battery through a resistor 53. The level of the reference voltage is determined depending upon the gear position of the automatic transmission coupled to the shift-down circuit 52.

The shift-down circuit 52 for the automatic transmission comprises a relay 60 having a normally close contact T60, a transistor 62 for driving the relay 60 and a solenoid 66.

The normally close contact T60 of the relay 60 connected to the solenoid 66 is connected to a transmission control switch 70. A coil L60 of the relay 60 and the transmission control switch 70 are connected to a battery 80 through a fuse 74, an ignition switch 76 and a fusible link 78.

When the solenoid 66 is energized from its deenergized state, the gears of the automatic transmission are shifted down. For example, if a fourth speed gear of the automatic transmission is being driven in the energized state of the solenoid 66, it is shifted down to a third speed gear when the solenoid 66 in deenergized.

The energization and the deenergization of the solenoid 66 are controlled by the transistor 62. When the output of the compare circuit 51 goes up and the transistor 62 is turned on from its off state, the relay 60 is energized to open the normally close contact T60. As a result, the solenoid 66 changes from its energized state to the deenergized state.

In the present embodiment, the operation when the vehicle runs on a flat road is identical to that of FIG. 1. The operation when the load to the engine increases as the vehicle goes up a slope is now explained. It is assumed that the car running at a constant speed with the fourth speed gear of the automatic transmission has begun to goes up the slope. As the vehicle speed begins to slow down from the preset vehicle speed, the compare circuit 20 produces the pulse signal output having a large duty factor or a wide "1" width. When the output signal of the integration circuit 56 exceeds the reference level of the compare circuit 51 as the vehicle speed slows down, the output of the compare circuit 51 goes up and the transistor 62 is turned on. Since the compare circuit 51 has the hysteresis characteristic, once it is turned on, it maintains the on (high) level until the output of the integration circuit 56 falls below a level which is slightly lower than the reference level.

As the transistor 62 is turned on, the solenoid 66 is deenergized and the gears of the automatic transmission are shifted down from the fourth speed to the third speed. As a result, the reduction of the vehicle speed is supplemented by the increase of the traction force and the vehicle can maintain the constant speed.

When the vehicle has passed through the slope and enters a flat road, the "1" width of the pulse signal from the compare circuit 20 is shortened. When the output signal of the integration circuit 56 falls below the level of the compare circuit 51, the transistor 62 is turned off. As a result, the gears of the automatic transmission is shifted back to the fourth speed from the third speed and the vehicle continues to run at the constant speed.

Figure 3:
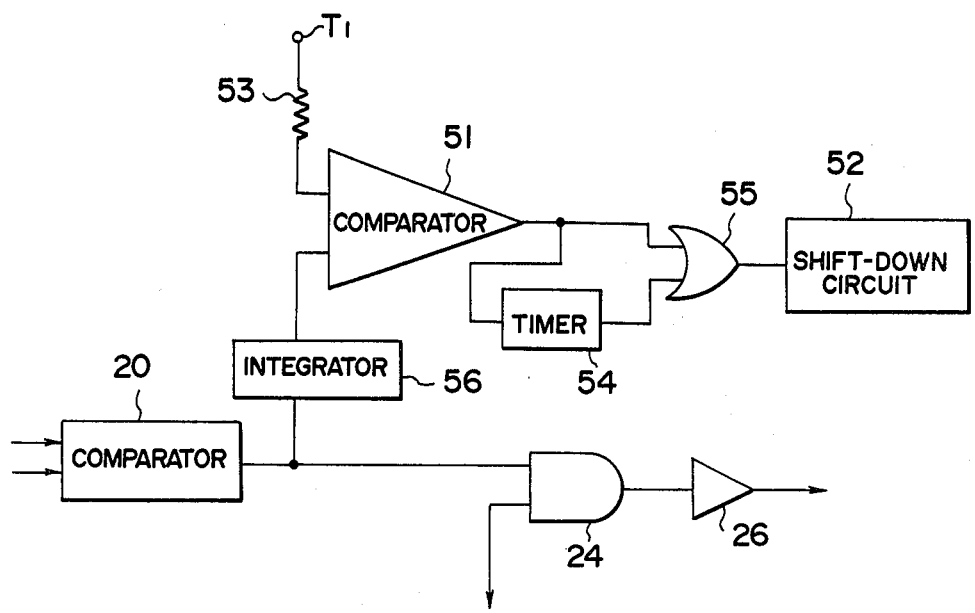
FIG. 3 shows a block diagram of major portions of another embodiment of the apparatus of the present invention.

FIG. 3 shows a block diagram of major portions of another embodiment of the present invention. The present invention is intended to achieve the second object of the present invention. A timer circuit 54 for producing a signal for a constant time period in response to an input signal thereto and an OR circuit 55 for producing a signal in accordance with an OR function of the output signal of the compare circuit 51 and the output signal of the timer circuit 54 are inserted between the compare circuit 51 and the shift-down circuit 52 shown in FIG. 2. The other elements are identical to those of the embodiment of FIG. 2. The like or corresponding elements are designated by the like numerals.

In the present embodiment, the operation of the shift-down of the automatic transmission when the vehicle running at a constant speed enters a slope and the vehicle speed begins to slow down from the preset vehicle speed is identical to that of the previous embodiment and hence the explanation thereof is omitted here.

Figure 4:
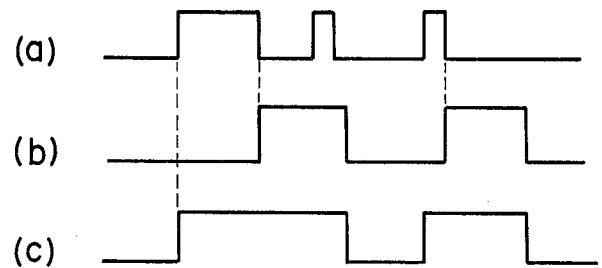
FIG. 4 shows voltage waveforms at various points in FIG. 3.

In the present embodiment, even when the output signal of the compare circuit 51 changes as shown in FIG. 4(a) by the change of the vehicle speed, the timer circuit 54 which is turned on when the compare circuit 51 is turned off maintains the on state for the constant time period, as shown in FIG. 4(b) as a result, the OR circuit 55 produces a signal waveform as shown in FIG. 4(c) so that the transistor 62 of the shift-down circuit 52 is operated to follow the waveform of FIG. 4(c).

Accordingly, in the present embodiment, even if the compare circuit 51 produces the on and off signals which causes the gears of the automatic transmission to frequently repeat the shift-down and shift-up operations, the OR circuit 55 produces the shift-down signal for the constant period so that the hunting of the vehicle which repeats the cycles of shift-up-reduction of vehicle speed-shift down-increase of vehicle speed-shift-up is prevented.

In the present embodiment, the same effect is attained by the compare circuit 51 having no hysteresis characteristic.

The vehicle equipped with the apparatus of the present embodiment was tested on a road having flat and sloped areas. For the setting speed of 80 km/h, the reduction of the running speed was within 8 km/h. The reduction of the running speed for the vehicle equipped with the prior art apparatus was 20 km/h.

In both of the embodiments described above, one of the gears of the automatic transmission is shifted down in accordance with the preset vehicle speed. By providing more than one compare circuits 51 and more than one shift-down circuits 52, more than one gears of the automatic transmission can be shifted down. For example, when two parallel sets of the compare circuit 51 and the shift-down circuit 52 are provided, the gear can be shifted down from the fourth speed to the third speed when the gear for one preset vehicle speed is the fourth speed gear, and the gear can be shifted down from the third speed to the second speed when the gear for the other preset vehicle speed is the third speed gear.

As described hereinabove, according to the present invention, when the vehicle running at the constant speed enters the slope and the load to the engine increases, the reduction of the vehicle speed is prevented by shifting down the gear of the automatic transmission in order to maintain the constant speed running. Furthermore, by holding the shift-down signal for the predetermined time, the hunting of the vehicle in which the gear of the automatic transmission repeats the shift-down and shift-up operations is prevented.

It should be apparent to those skilled in the art that the above-described embodiment represents but one of the many possible specific embodiments of the present invention. Numerous and varied other embodiments can be devised by those skilled in the art without departing from the spirit and scope of the present invention.

What is claimed is:

1. Apparatus for running a vehicle having an automatic transmission at a constant speed, comprising:
   vehicle speed signal generating means for generating a signal representative of an actual speed of said vehicle;
   vehicle speed setting means for presetting a desired vehicle speed in a constant speed running condition of said vehicle;
   preset vehicle speed signal generating means for holding the output signal of said vehicle speed signal generating means generated when a vehicle speed is preset by said vehicle speed setting means and producing the preset vehicle speed;
   vehicle speed compare means for comparing the output signal of said preset vehicle speed signal generating means and the output signal of said vehicle speed signal generating means to produce a signal representative of a compare result;
   throttle valve control means for controlling an aperture of a throttle valve in accordance with the output signal of said compare means; and
   drive means for driving an engine in accordance with the aperture of said throttle valve,
   characterized by:
   preset vehicle maintenance detecting means for comparing the output signal of said vehicle speed compare means with a reference signal determined in accordance with the vehicle speed at the time when said vehicle speed setting means presets the desired vehicle speed, the level of the reference signal being determined by the gear position of said automatic transmission and producing a signal when the output signal of said vehicle speed compare means exceeds the level of said reference; signal and
   a shift-down circuit for shifting the automatic transmission into a lower gear in the constant speed running condition in response to the output signal from said preset vehicle speed maintenance detecting means.

2. Apparatus according to claim 1 wherein said shift-down circuit includes a transistor adapted to be activated in response to the output signal of said preset vehicle speed maintenance detecting means, a relay adapted to be energized in response to the activation of said transistor and a solenoid adapted to be deenergized in response to the energization of said relay to cause said transmission to shift-down the gear position.

3. Apparatus according to claim 1 wherein the output signal of said vehicle speed compare means exceeds said reference signal determined in accordance with said vehicle speed setting means and the gear position when the actual vehicle speed is lower than the desired vehicle speed in the constant speed running condition.

4. Apparatus according to claim 1 wherein said preset vehicle speed maintenance detecting means includes an integration circuit for integrating the output signal of said vehicle speed compare means and a compare circuit for comparing the output signal of said integration circuit with a reference signal determined by the gear position.

5. Apparatus according to claim 4 wherein said compare circuit has a hysteresis characteristic.

6. Apparatus for running a vehicle having an automatic transmission at a constant speed, comprising:
   vehicle speed signal generating means for generating a signal representative of an actual speed of said vehicle;
   vehicle speed setting means for presetting a desired vehicle speed in a constant speed running condition of said vehicle;
   preset vehicle speed signal generating means for holding the output signal of said vehicle speed signal generating means generated when a vehicle speed is preset by said vehicle speed setting means and producing the preset vehicle speed;
   vehicle speed compare means for comparing the output signal of said preset vehicle speed signal generating means and the output signal of said vehicle speed signal generating means to produce a signal representative of a compare result;
   throttle valve control means for controlling an aperture of a throttle valve in accordance with the output signal of said compare means, and
   drive means for driving an engine in accordance with the aperture of said throttle valve,
   characterized by:
   preset vehicle maintenance detecting means for comparing the output signal of said vehicle speed compare means with a reference signal determined in accordance with the vehicle speed at the time when said vehicle speed setting means presets the desired vehicle speed, the level ofthe reference signal being determined by the gear position of said automatic transmission and producing a signal when the output signal of said compare means exceeds the level of said reference signal;
   a timer responsive to the output signal from said preset vehicle speed maintenance detecting means for producing said output signal for a predetermined time; and
   a shift-down circuit responsive to an OR function of the output signal of said preset vehicle velocity maintenance detecting means and the output signal of said timer for shifting the automatic transmission into a lower gear in the constant speed running condition.

7. Apparatus according to claim 6 wherein said shift-down circuit includes an OR circuit for ORing the output signal of said preset vehicle speed maintenance detecting means and the output signal of said timer, a transistor adapted to be activated in response to the output signal of said OR circuit, a relay adapted to be energized in response to the activation of said transistor and a solenoid adapted to be deenergized in response to the energization of said relay to cause said transmission to shift-down the gear position.

8. Apparatus according to claim 6 wherein the output signal of said vehicle speed compare means exceeds said reference signal determined by said vehicle speed setting means and the gear position when an actual vehicle speed is lower than the desired vehicle speed in the constant speed running condition.

9. Apparatus according to claim 6 wherein said preset vehicle speed maintenance detecting means includes an integration circuit for integrating the output signals of said vehicle speed compare means and a compare circuit for comparing the output signal of said integration circuit with said reference signal determined by the gear position.

10. Apparatus according to claim 9 wherein said compare circuit has a hysteresis characteristic.

* * * * *